(12) United States Patent
Schroeck

(10) Patent No.: US 10,017,214 B1
(45) Date of Patent: Jul. 10, 2018

(54) AIR RAIL ASSEMBLY FOR IMPROVED AERODYNAMIC PERFORMANCE OF MOTOR VEHICLE CARGO COMPARTMENTS

(71) Applicant: GM GLOBAL TECHNOLOGY OPERATIONS LLC, Detroit, MI (US)

(72) Inventor: David Schroeck, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 50 days.

(21) Appl. No.: 15/383,154

(22) Filed: Dec. 19, 2016

(51) Int. Cl.
*B60J 9/00* (2006.01)
*B62D 35/00* (2006.01)

(52) U.S. Cl.
CPC .................. *B62D 35/008* (2013.01)

(58) Field of Classification Search
CPC .................................................. B62D 35/008
See application file for complete search history.

(56) References Cited

U.S. PATENT DOCUMENTS

| | | | |
|---|---|---|---|
| 5,280,990 A | 1/1994 | Rinard | |
| 5,360,252 A | 11/1994 | Larsen | |
| 7,192,077 B1 | 3/2007 | Hilleman | |
| 8,196,994 B2 | 6/2012 | Chen | |
| 2011/0068604 A1 | 3/2011 | Neuberger et al. | |
| 2011/0095564 A1 | 4/2011 | Chen | |
| 2011/0095566 A1 | 4/2011 | Chen | |
| 2011/0140605 A1* | 6/2011 | Mann ...................... | B60Q 1/24 315/77 |
| 2011/0148140 A1 | 6/2011 | Benton | |
| 2011/0175395 A1 | 7/2011 | Guigne et al. | |
| 2013/0062908 A1 | 3/2013 | Henderson et al. | |
| 2017/0057425 A1* | 3/2017 | Pulleyblank ............ | B60R 13/01 |
| 2017/0137075 A1* | 5/2017 | Povinelli .............. | B62D 35/008 |

OTHER PUBLICATIONS

"Aston Martin Unveils the DB11: the Latest in an Illustrious Bloodline" Mar. 1, 2016.

* cited by examiner

*Primary Examiner* — Lori L Lyjak
(74) *Attorney, Agent, or Firm* — Quinn IP Law

(57) ABSTRACT

Disclosed are air rail assemblies for improved vehicle aerodynamics, methods for making and methods for using such air rail assemblies, and motor vehicles employing air rail assemblies for reducing turbulent flow and wake bubbles in and around the rear cargo bed. An air rail assembly for a motor vehicle is disclosed that includes an inlet port that extends through the rear quarter panel of a cargo bed sidewall. The inlet port intakes passing fore-aft airflow. An outlet port extends through a rail cap and ejects airflow intake from the cargo sidewall. An air duct, which attaches to an inboard surface of the rear quarter panel, fluidly connects the air inlet and outlet ports. The air duct includes transverse and vertical channels that cooperatively redirect the airflow intake in an inboard and upward direction. The air duct includes convergent portions that constrict and accelerate the airflow intake.

20 Claims, 2 Drawing Sheets

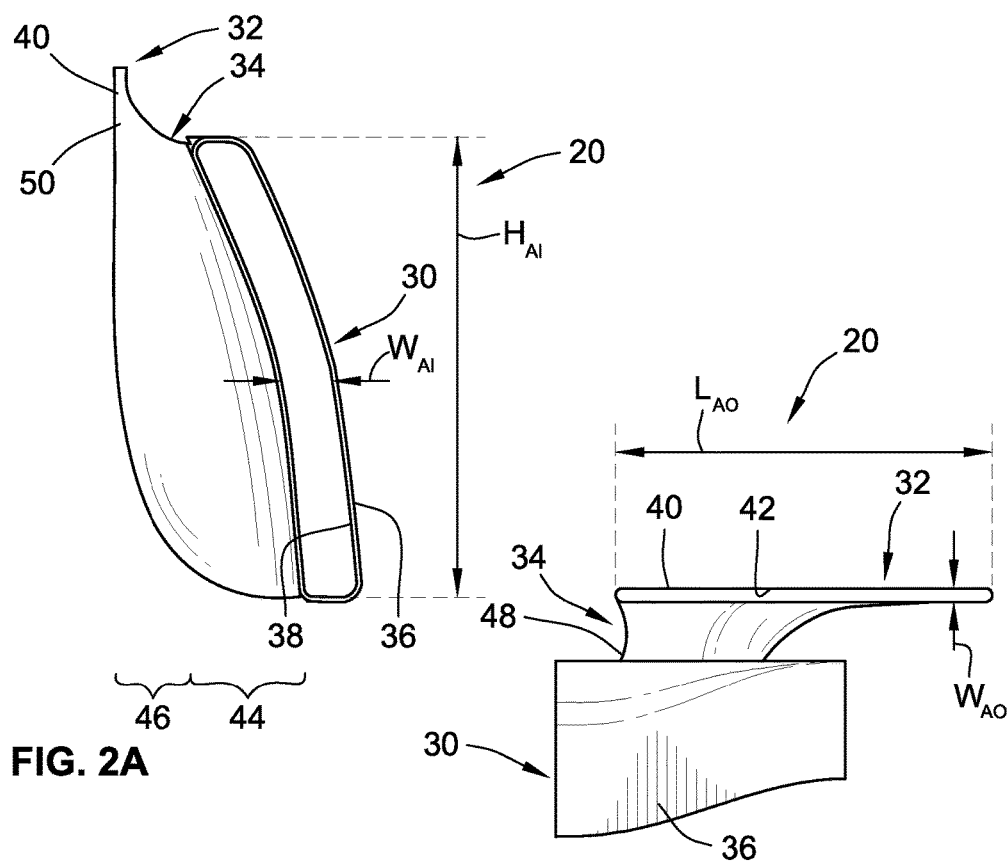
FIG. 2A
FIG. 2B
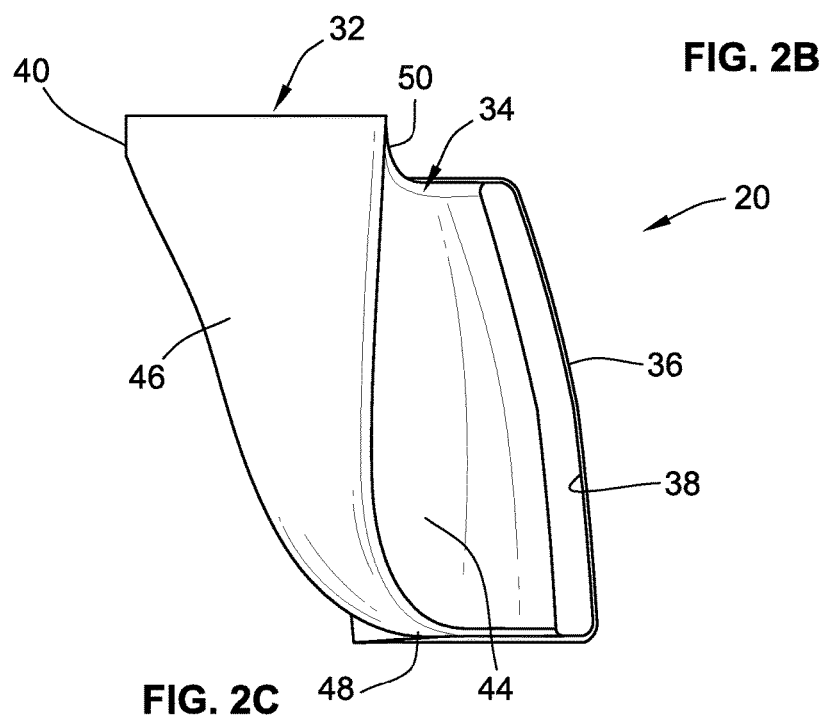
FIG. 2C

AIR RAIL ASSEMBLY FOR IMPROVED AERODYNAMIC PERFORMANCE OF MOTOR VEHICLE CARGO COMPARTMENTS

INTRODUCTION

The present disclosure relates generally to features for improving the aerodynamic characteristics of motor vehicles. More specifically, aspects of this disclosure relate to systems, methods and devices for reducing aerodynamic drag caused by wake bubbles and turbulent flow in and around cargo compartments of pickup trucks.

Most current production motor vehicles, such as the modern-day automobile, are originally equipped with a dedicated storage area next to the passenger compartment for stowing personal effects and belongings. A traditional trunk compartment, for example, is a large storage bin located at the rear of the vehicle and covered by a trunk lid that is hinged underneath the passenger compartment's rear deck. By comparison, the dedicated storage area of a pickup truck and other cargo transport vehicles (e.g., sport utility vehicles (SUV), cargo vans, box trucks, etc.) is typified by a rear cargo compartment that is closed off at the tail end by a hinged liftgate, tailgate or door assembly. Truck cargo compartments normally offer more storage volume than their conventional trunk counterparts by providing increased floor space with an elevated cargo ceiling (vans, SUVs, box trucks, etc.) or an open cargo area without a ceiling (pickups, flatbeds, etc.).

There are certain aerodynamic inefficiencies associated with the basic configuration of a pickup truck and other cargo transport vehicles. For pickup trucks, these inefficiencies are due, in large part, to the "bluff-bodied" passenger cab and the open bed that is closed off by a tailgate. Ambient airstreams flow relatively smoothly over the engine hood and truck cab. However, when the airstream flows aft of the blunt-ended cab and into the rear bed portion of the truck, three phenomena develop during this transition which affect viscous/inviscid flow, pressure distribution, and skin friction: flow separation (also known as "eddy shedding"), turbulent airflow, and aerodynamically unfavorable pressure gradients. These phenomena can lead to, among other things, increased aerodynamic drag forces and exaggerated aerodynamic lift. At typical highway cruising speeds, the majority of fuel consumed by an automobile is spent in overcoming aerodynamic drag—aerodynamic drag normally increasing with the square of speed.

Efforts have been made to remedy or at least alleviate the aerodynamic inefficiencies associated with the standard configuration of a pickup truck. One approach is to attach an air spoiler—similar in geometry to an inverted airfoil—to a select area of the vehicle body in order to modify airflow around the vehicle and provide certain predetermined aerodynamic responses during vehicle operation. Another proposed remedy is to reconfigure the cargo compartment by including a camper shell or a truck bed cover (also known as a "tonneau cover") to streamline and smooth airflow across the bed. A different known solution is to use a fixed cab extender consisting of a partially curved panel that is mounted to a rear edge of the cab, extending aft over a forward portion of the cargo bed to reduce flow separation and the size of wake vortices. Another known approach is to increase the height of the cargo bed sidewalls to hinder part of the flow from the side of the vehicle from entering the cargo bed. An active approach to mitigating aerodynamic drag for some vehicles is to use a motor-driven pump to inject air into strategic locations through a series of nozzles spaced along the rear roof rail.

SUMMARY

Disclosed herein are air rail assemblies for improving aerodynamic flow across vehicle cargo compartments, methods for making and methods for using such air rail assemblies, and motor vehicles with one or more air rail assemblies for improving airflow in, above and around the vehicle's rear cargo bed. By way of example, and not limitation, there is presented an air rail architecture that helps to improve aerodynamic performance of pickup trucks by controlling airflow proximate the pickup bed. This air rail configuration employs a forward-facing air scoop or submerged inlet port positioned towards the forward edge on the outboard (Class A) surface of each rear quarter panel. A convergent air duct or other fluid conduit mounted to the inboard surface of the quarter panel fluidly connects the scoop/inlet to a longitudinally elongated outlet port located in the cap of the cargo bed sidewall. As the vehicle moves in a normal forward direction, air passes around the vehicle body and enters the scoop/inlet, passes through the duct in an inboard and upward direction, is constricted to increase fluid velocity, and is ejected through the outlet port. By injecting pressurized fluid in this manner, the aerodynamic flow over the cargo bed is altered in a way that a net drag improvement is achieved.

The location and orientation of the inlet opening on the rear quarter panel and the outlet opening on the cap of the cargo bed sidewall can be modified, for example, for application to different vehicle platforms. In the same vein, the number, shape and size of the inlet, outlet, and/or duct can be individually or collectively tuned as desired, for example, to modify the vehicle's aerodynamic performance. The outboard-to-inboard angle of the airflow leaving the outlet port can be perpendicular to the sidewall cap, parallel to the cap, or at any oblique angle therebetween. Likewise, the fore-to-aft angle can be selectively varied. On optional variation executes the air inlet as a handle, e.g., to provide an aid for users when stepping on a running board or a box-integrated step.

Attendant benefits for at least some of the disclosed concepts include the ability to attenuate wake turbulence and control the shape and size of the wake bubble in an open rear cargo compartment of a bluff-bodied motor vehicle. This, in turn, provides a quantifiable reduction in aerodynamic drag which results in an increase in vehicle fuel economy. Disclosed concepts also help to overcome deficiencies with known approaches for alleviating the aerodynamic inefficiencies associated with pickup trucks. For instance, disclosed air rail architectures do not impede access to the rear cargo compartment or consume cargo bed storage space, as do many tonneau covers, increased-height cargo bed sidewalls, camper shells, and rear pickup spoilers. Compared to these conventional approaches, disclosed air rail assemblies are also significantly lighter in weight, more compact, and lower in cost.

Aspects of the present disclosure are directed to air rails for improving aerodynamic flow across rear cargo compartments of motor vehicles, such as pickup trucks and other cargo transport vehicles. Disclosed, for example, is an air rail assembly for a motor vehicle with a rear cargo compartment aft of a passenger compartment. The cargo compartment includes a cargo bed adjoined by laterally spaced cargo sidewalls. Each cargo sidewall includes a rail cap projecting, e.g., horizontally inboard, from an upper edge or similar portion of a rear quarter panel. The air rail assembly includes an air inlet port, such as an air scoop or NACA duct, that extends through the rear quarter panel of the cargo sidewall, and is designed to draw in passing fore-aft airflow. An air outlet port, such as an air knife nozzle, extends through the rail cap and ejects airflow intake from the cargo sidewall, e.g., in an upward and/or aft direction. An air duct, which attaches to an inboard/interior surface of the rear quarter panel, fluidly connects the air inlet and outlet ports. This air duct includes transverse and vertical channels that redirect the airflow intake in an inboard and upward direction. The inlet port, outlet port and air duct may be assembled into a bipartite or tripartite construction or, alternatively, may be integrally formed (e.g., blow molded) as a single-piece, unitary structure.

Other aspects of the present disclosure are directed to motor vehicles with one or more air rail assemblies for improving aerodynamic flow in, above and around the vehicle's rear cargo bed. A "motor vehicle," as used herein, may include any relevant vehicle platform, such as passenger vehicles (internal combustion engine (ICE), hybrid electric, full electric, fuel cell, fuel cell hybrid, fully or partially autonomous, etc.), commercial vehicles, industrial vehicles, tracked vehicles, off-road and all-terrain vehicles (ATV), farm equipment, etc. In an example, a motor vehicle is presented that includes a vehicle body with a rear cargo compartment aft of a passenger compartment. The rear cargo compartment is composed of a generally horizontal cargo bed that is adjoined along lateral edges thereof by opposing generally vertical cargo sidewalls. Each cargo sidewall includes a rear quarter panel with a rail cap projecting transversely from an upper edge of the rear quarter panel.

A respective air rail assembly is mounted to each one of the cargo sidewalls on the interior of the vehicle body. Each air rail assembly is fabricated with an air inlet port that extends through the rear quarter panel of a cargo sidewall. The air inlet port is configured to intake fore-aft airflow. Each air rail assembly also includes an air outlet port that extends through the rail cap of a cargo sidewall. The air outlet port is configured to eject the airflow intake over the cargo bed. To increase fluid velocity, the cross-sectional area of the outlet port is smaller than the cross-sectional area of the inlet port. A convergent air duct is mounted to an inboard surface of the rear quarter panel. The air duct fluidly connects the air inlet port with the air outlet port. This air duct includes a transverse channel interconnected with a vertical channel to constrict and redirect the airflow intake in an inboard and upward direction.

Additional aspects of this disclosure are directed to methods of making, methods of using, and methods of attaching air rails for improving aerodynamic flow across cargo compartments of motor vehicles. For instance, a method is disclosed for attaching an air rail assembly to a motor vehicle. The method includes, in any order and in any combination with any disclosed options: passing an air inlet port through the rear quarter panel of a cargo bed sidewall, the air inlet port being configured to intake fore-aft airflow; passing an air outlet port through a horizontal rail cap of the cargo bed sidewall, the air outlet port being configured to eject the airflow intake from the cargo sidewall; and, attaching an air duct to an inboard surface of the rear quarter panel, the air duct fluidly connecting the inlet and outlet ports, the air duct including transverse and vertical channels configured to redirect the airflow intake in an inboard and upward direction.

The above summary is not intended to represent every embodiment or every aspect of the present disclosure. Rather, the foregoing summary merely provides an exemplification of some of the novel aspects and features set forth herein. The above features and advantages, and other features and advantages of the present disclosure, will be readily apparent from the following detailed description of representative embodiments and representative modes for carrying out the present disclosure when taken in connection with the accompanying drawings and the appended claims. Moreover, this disclosure expressly includes any and all combinations and subcombinations of the elements and features presented above and below.

BRIEF DESCRIPTION OF THE DRAWINGS

FIGS. 2A, 2B and 2C are front, plan, and side perspective-view illustrations, respectively, of the representative air rail assembly of FIG. 1.

Figure 1:
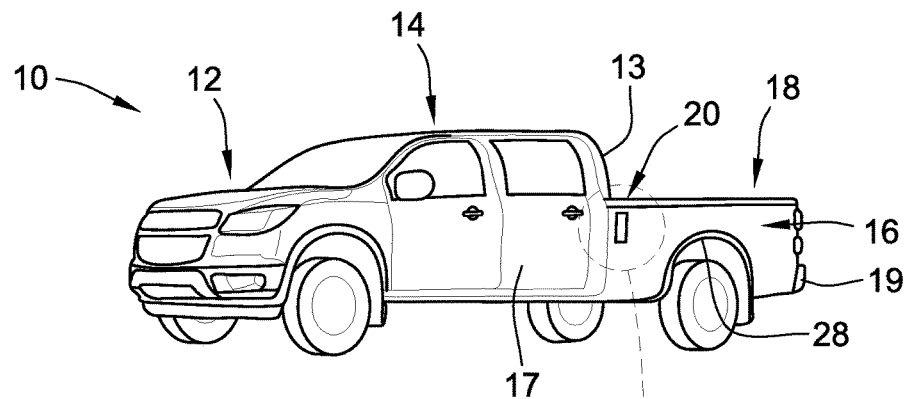
FIG. 1 is a side perspective-view illustration of a representative motor vehicle with an inset view of an air rail assembly for improved aerodynamic flow across an open rear cargo compartment in accordance with aspects of the present disclosure.
Figure 1:
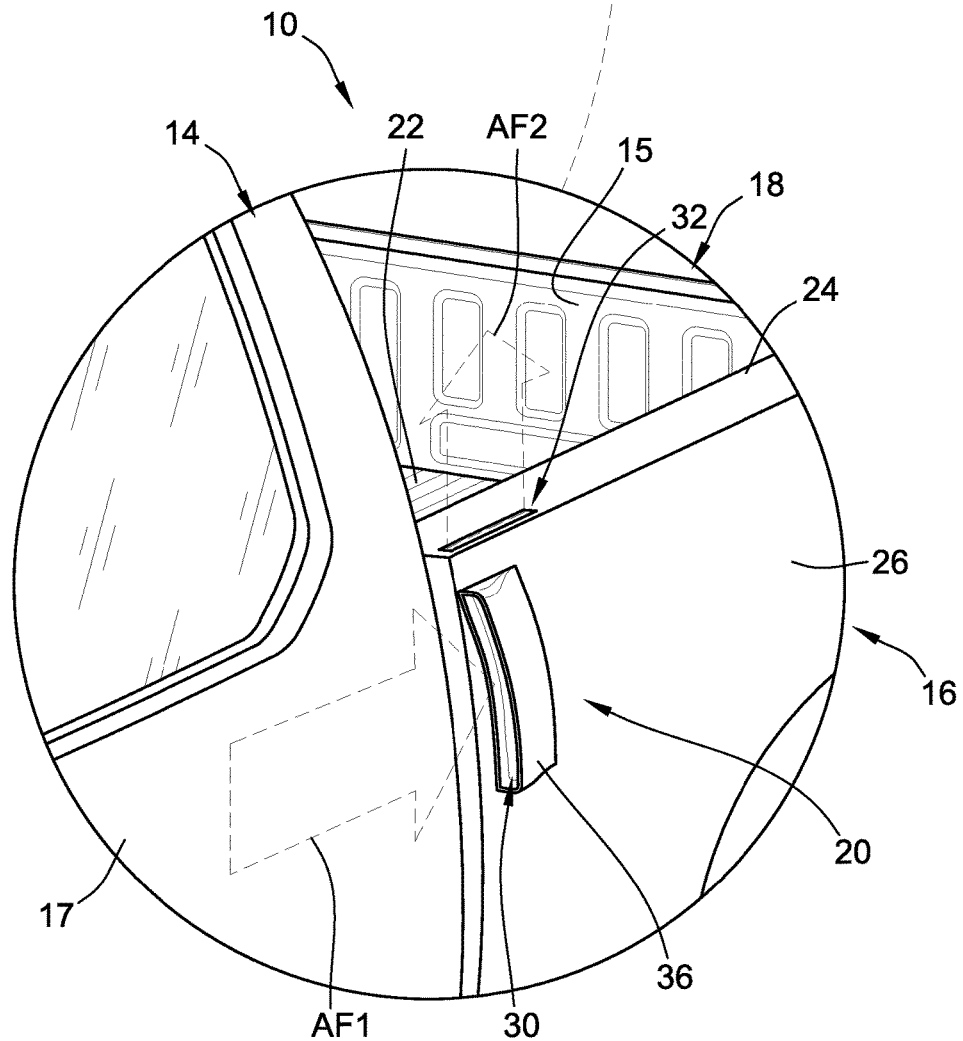

The present disclosure is susceptible to various modifications and alternative forms, and some representative embodiments have been shown by way of example in the drawings and will be described in detail herein. It should be understood, however, that the novel aspects of this disclosure are not limited to the particular forms illustrated in the appended drawings. Rather, the disclosure is to cover all modifications, equivalents, combinations, subcombinations, permutations, groupings, and alternatives falling within the scope and spirit of the disclosure.

DETAILED DESCRIPTION

This disclosure is susceptible of embodiment in many different forms. There are shown in the drawings and will herein be described in detail representative embodiments of the disclosure with the understanding that these representative embodiments are to be considered an exemplification of the principles of the disclosure and are not intended to limit the broad aspects of the disclosure to the illustrated embodiments. To that extent, elements and limitations that are disclosed, for example, in the Abstract, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the word "all" means "any and all"; the word "any" means "any and all"; and the words "including" and "comprising" and "having" mean "including without limitation." Moreover, words of approximation, such as "about," "almost," "substantially," "approximately," and the like, may be used herein in the sense of "at, near, or nearly at," or "within 3-5% of," or "within acceptable manufacturing tolerances," or any logical combination thereof, for example. Lastly, directional adjectives, such as fore, aft, inboard, outboard, vertical, horizontal, upward, downward, etc., may be with respect to a motor vehicle, such as a forward driving direction of a motor vehicle when said vehicle is operatively oriented on a normal driving surface.

Referring now to the drawings, wherein like reference numbers refer to like features throughout the several views, there is shown in FIG. 1 a perspective-view illustration of a representative automobile, which is designated generally at 10 and portrayed herein for purposes of discussion as an extended cab pickup truck. Mounted to the vehicle 10 body, e.g., aft of an engine compartment 12 and a passenger compartment 14, within a sidewall 16 of an open rear cargo compartment 18 (also referred to herein as "cargo box"), is an air rail assembly 20 for improving aerodynamic performance of the vehicle 10. The illustrated automobile 10—also referred to herein as "motor vehicle" or "vehicle" for short—is merely an exemplary application with which the novel aspects and features of this disclosure may be practiced. In the same vein, implementation of the present concepts into an open rear cargo bed should also be appreciated as an exemplary application of the novel concepts disclosed herein. As such, it will be understood that the aspects and features of the present disclosure may be incorporated into other cargo compartment configurations, and may be implemented for any logically relevant type of motor vehicle. Lastly, the drawings presented herein are not necessarily to scale and are provided purely for instructional purposes. Thus, the specific and relative dimensions shown in the drawings are not to be construed as limiting.

With collective reference to the perspective and inset views presented in FIG. 1, the rear cargo compartment 18 of the pickup truck 10 is originally equipped with an open, generally horizontal cargo bed 22 that is shaped and sized, e.g., to provide additional cargo storage volume for hauling oversize equipment, tools and trade supplies. The rear cargo compartment 18 may be customized with storage boxes, shelving, racks, a tonneau or camper cover, etc., to accommodate more specific storage and hauling needs. Fore and aft edges of the cargo bed 22 respectively terminate at a generally vertical forward endwall 13 and a pivotably mounted and latched tailgate assembly 15. Adjoined at laterally opposite edges of the cargo bed 22 are opposing (port and starboard) cargo sidewalls, labelled generally at 16 (only one of which can be seen in the drawings; a mirror counterpart is disposed at the opposite lateral end of the bed). These cargo bed sidewalls 16 are generally parallel to each other and project generally orthogonally from the cargo bed 22 to delineate that lateral extent of the cargo compartment 18. Each cargo sidewall 16 is an assembly of, or an integrally formed structure with, a longitudinally elongated rail cap 24 that projects, e.g., inboard in a generally horizontal fashion, from an upper edge or other commensurate portion of a rear quarter panel 26. The rear quarter panel 26 is an exterior (Class A Surface) body panel located aft of the vehicle passenger compartment 14, e.g., interposed between a rear-most occupant door 17 and a rear bumper fascia 19, that at least partially defines a rear wheel well 28.

To improve aerodynamic flow in, above, and around the cargo compartment 18, the vehicle 10 is equipped with one or more air rail assemblies 20 that help to attenuate wake turbulence and regulate wake bubble formations in the open cargo bed 22. Pickup truck 10 of FIG. 1, for instance, is provided with a pair of air rail assemblies 20 (only one is labelled in FIG. 1), each of which is mounted, e.g., via fasteners or mounting brackets, proximate a leading edge of a respective cargo sidewall 16 adjacent a B or C-pillar. While not per se required, the two air rail assemblies 20 of FIG. 1 may be substantially identical mirrored counterparts; thus, for purposes of brevity, structural features of both assemblies can be described by way of reference to the first (port-side) air rail assembly 20. In accord with the illustrated example, the air rail assembly 20 is composed of three primary segments: an air inlet port 30, an air outlet port 32, and an air duct 34, wherein the fully assembled/formed air rail construction is best seen in FIGS. 2A-2C. It may be desirable, for at least some embodiments, that the air rail assembly 20 be fabricated from a robust and rigid yet light-weight and weather resistant material, such as steel, aluminum or titanium alloys, carbon fiber composites, polyethylenes, polypropylenes, polyethers, polycarbonates, polyethylene terephthlates (PET), polyvinyl chlorides (PVC), or any combination thereof. While it is envisioned that the inlet port 30, outlet port 32, and/or air duct 34 may be fabricated as discrete components that are subsequently assembled into a bipartite or tripartite unit, it may be desirable that the air rail assembly 20 be integrally formed (e.g., via hydroforming or injection molding) as a single-piece unitary structure. Optionally, the number, shape and/or size of air inlet ports, air outlet ports, and/or air ducts can be varied, individually or collectively, for each air rail assembly 20. In the same vein, the location, orientation, and quantity of air rail assemblies can also be modified from that which are shown in the drawings.

Air inlet 30 acts as an ambient air intake port that either passively allows air flowing front-to-back along the side of the vehicle 10 to enter the air rail assembly 20 or dynamically draws fore-aft flowing air into the air rail assembly 20. By way of example, and not limitation, the air inlet port 30 extends through a forward, upper section of the cargo sidewall's rear quarter panel 26, and is designed to intake fore-aft airflow, illustrated for purposes of description by arrow AF1 in the inset view of FIG. 1. For instance, the air inlet port 30 is illustrated in the drawings as an air scoop that is composed of a curvilinear scoop body 36 formed with a single, forward-facing intake opening 38. The scoop body 36 can be seen in FIG. 1 protruding laterally from an outboard (exterior) surface of the rear quarter panel 26. The inboard surface of scoop body 36 may be shaped to conform to and thereby sit flush against the rear quarter panel 26. Alternatively, the scoop may be fabricated as an integral part of the rear quarter panel. A foam or adhesive sealant may be provided to seal the aperture in the rear quarter panel 26 through which the scoop body 36 extends. The forward-facing intake opening 38 has a curved, oblong shape that has a generally vertical orientation with respect to the cargo sidewall 16.

Alternative applications may forego the use of an air scoop, and instead employ one or more submerged inlet ports (also known as "NACA ducts") with a shallow ramp adjoined by curved sidewalls that recess into the outboard surface of the rear quarter panel 26. It is also envisioned that the air inlet port 30 employ one or more louver flaps that are angled to admit ambient air, but to keep out rain, dirt, and debris. For at least some embodiments, the air inlet port 30 has a transversely oriented air inlet width $W_{AI}$ that is appreciably smaller than a vertically oriented air inlet height $H_{AI}$. By way of example, a ratio of the height $H_{AI}$ to the width $W_{AI}$ of the air inlet port 30 may be approximately 5:1 to 10:1. Some specific examples may require the air inlet port 30 be approximately 200 mm to 300 mm high and approximately 15 mm to 30 mm wide or, for a specific example, the air inlet port 30 is approximately 240 mm high and approximately 26 mm wide. It is also envisioned that the inlet width may vary along the inlet height.

Air outlet 32 acts as a fluid control nozzle that helps to regulate the direction, shape and speed of airflow exiting the air rail assembly 20. By way of non-limiting example, the air outlet port 32 extends through a forward, generally horizontal section of the cargo sidewall's rail cap 24, and is designed to eject a high-intensity, uniform sheet of laminar airflow from the cargo sidewall 16, illustrated for purposes of description by arrow AF2 in the inset view of FIG. 1. For instance, the air outlet port 32 is illustrated in the drawings as an air knife nozzle 40 with a single, upward-facing ejection slot 42. Shown as an elongated continuous opening, the ejection slot 42 is substantially flush with the upper-most surface of the rail cap 24. This slot 42 operates to inject airflow upward, e.g., at a right angle, or inboard, e.g., at an oblique angle, relative to the upper surface of the rail cap 24. A hydrophobic screen or a water flap valve may be added to the air outlet port 32 to help minimize the inadvertent ingress of water, dirt, and other contaminants. For at least some embodiments, the air outlet port 32 has a transversely oriented air outlet width $W_{AO}$ that is substantially smaller than a longitudinally oriented air outlet length $L_{AO}$. As an example, a ratio of the length $L_{AO}$ to the width $W_{AO}$ of the air outlet port 32 is approximately 15:1 to 30:1. Some specific examples may require the air outlet port 32 be approximately 150 mm to 250 mm high and approximately 5 mm to 10 mm wide or, for a specific example, approximately 200 mm long and 7 mm wide. It is also envisioned that the outlet width may vary along the outlet length.

With reference to FIGS. 2A through 2C, the air duct 34 functions as a fluid conduit that fluidly interconnects the air inlet and outlet ports 30, 32 such that ambient air intake is readily conveyed from the inlet 30, through the air duct 34, to the outlet 32 for ejection from the air rail assembly 20 towards the cargo compartment 18. According to the illustrated example, the air duct 34 is mounted on, packaged against or otherwise operatively attached to an inboard surface of the rear quarter panel 26, e.g., via fasteners, adhesives, interference fit, or mounting brackets. As shown, the air duct 34 is composed of two integrally formed, fluidly connected sections: a laterally oriented transverse channel 44, and an upwardly extending vertical channel 46. The transverse channel 44 operates to redirect the airflow intake AF1 drawn in by air inlet port 30 from a fore-to-aft direction of travel to an outboard-to-inboard direction of travel. Vertical channel 46 then operates to partially redirect the airflow from an outboard-to-inboard direction to an upward direction. As can be seen in the drawings, the transverse channel 44 is fluidly downstream from the air inlet port 30 and fluidly upstream from the vertical channel 46, while both the transverse and vertical channels 44, 46 are fluidly upstream from the air outlet port 32. It is certainly within the scope of this disclosure to reverse the relative positions of the transverse and vertical channels 44, 46.

For at least some configurations, the air duct 34 is a convergent-type air duct that constricts fluid flow and thereby increases fluid velocity. At the inlet to the transverse channel 44, for example, the air duct 34 includes a first constricted section 48 that narrows in cross-sectional flow area and thereby accelerates the airflow intake. This constricted section 48 is fluidly upstream from the transverse and vertical channels 44, 46, and fluidly downstream from the air inlet port 30. At the outlet of the vertical channel 46 is a second constricted section 50 that further narrows in cross-sectional flow area and thereby accelerates the airflow intake a second time. The second constricted section 50 is fluidly downstream from the transverse and vertical channels 44, 46, and fluidly upstream from the air outlet port 32. For at least some embodiments, the air duct 34 has a total contraction ratio of approximately 3.5:1 to 5.5:1. For at least some embodiments, the total contraction ratio may be approximately 4.5:1. To the description of the design, the inlet, outlet or the duct can have guiding vanes to improve the airflow through the system, provide a means of protection against debris getting into the system, for structural support and/or aesthetic reasons. An optional design feature of the duct is that the lowest part of the duct is higher than or at the same height as the lowest part of the inlet opening, e.g., to allow water that enters through the outlet to leave through the inlet without the need of adding additional drain holes in the duct which might compromise the aerodynamic performance of the system. The air inlet can also be configured as a handle, e.g., to provide an aid for users when stepping on a running board or a box-integrated step.

While aspects of the present disclosure have been described in detail with reference to the illustrated embodiments, those skilled in the art will recognize that many modifications may be made thereto without departing from the scope of the present disclosure. The present disclosure is not limited to the precise construction and compositions disclosed herein; any and all modifications, changes, and variations apparent from the foregoing descriptions are within the spirit and scope of the disclosure as defined in the appended claims. Moreover, the present concepts expressly include any and all combinations and subcombinations of the preceding elements and features.

What is claimed:

1. An air rail assembly for a motor vehicle, the motor vehicle including a rear cargo compartment with a cargo bed adjoined by a cargo sidewall, the cargo sidewall including a rail cap projecting from an upper portion of a rear quarter panel, the air rail assembly comprising:
    an air inlet port configured to extend through the rear quarter panel of the cargo sidewall and intake fore-aft airflow;
    an air outlet port configured to extend through the rail cap and eject the airflow intake from the cargo sidewall; and
    an air duct configured to attach to an inboard surface of the rear quarter panel, the air duct fluidly connecting the air inlet port with the air outlet port, the air duct including transverse and vertical channels configured to redirect the airflow intake in an inboard and upward direction.

2. The air rail assembly of claim 1, wherein the air inlet port includes an air scoop with a scoop body having a forward-facing intake opening, the scoop body being configured to protrude from an outboard surface of the rear quarter panel.

3. The air rail assembly of claim 1, wherein the air outlet port includes an air knife nozzle configured to eject the airflow intake upward at a right angle or inboard at an oblique angle relative to an upper surface of the rail cap.

4. The air rail assembly of claim 1, wherein the air duct is a convergent air duct with a contraction ratio of approximately 3.5:1 to 5.5:1.

5. The air rail assembly of claim 1, wherein the air duct further includes a first constricted section configured to constrict and thereby accelerate the airflow intake.

6. The air rail assembly of claim 5, wherein the first constricted section of the air duct is fluidly upstream from the transverse and vertical channels.

7. The air rail assembly of claim 1, wherein the air duct further includes a second constricted section configured to constrict and thereby accelerate the airflow intake.

8. The air rail assembly of claim 7, wherein the second constricted section is fluidly downstream from the transverse and vertical channels.

9. The air rail assembly of claim 1, wherein the transverse channel is fluidly upstream from the vertical channel.

10. The air rail assembly of claim 1, wherein the air inlet port has a height and a width, wherein a ratio of the height to the width of the air inlet port is approximately 5:1 to 10:1.

11. The air rail assembly of claim 1, wherein the air outlet port has a width and a length, wherein a ratio of the width to the length of the air outlet port is approximately 15:1 to 30:1.

12. The air rail assembly of claim 1, wherein the air inlet port, the air outlet port, and the air duct are integrally formed as a single-piece unitary structure.

13. A motor electric vehicle, comprising:
a vehicle body with a rear cargo compartment aft of a passenger compartment, the rear cargo compartment including a cargo bed adjoined along lateral edges thereof by opposing cargo sidewalls, each of the cargo sidewalls including a rear quarter panel with a rail cap projecting transversely from an upper edge of the rear quarter panel; and
a pair of air rail assemblies each mounted to a respective one of the cargo sidewalls, each of the air rail assemblies including:
an air inlet port extending through the rear quarter panel of the cargo sidewall, the air inlet port being configured to intake fore-aft airflow;
an air outlet port extending through the rail cap of the cargo sidewall, the air outlet port being configured to eject the airflow intake over the cargo bed, a cross-sectional area of the air outlet port being smaller than a cross-sectional area of the air inlet port; and
a convergent air duct attached to an inboard surface of the rear quarter panel, the air duct fluidly connecting the air inlet port with the air outlet port, the air duct including transverse and vertical channels cooperatively configured to constrict and redirect the airflow intake in an inboard and upward direction.

14. A method of attaching an air rail assembly to a motor vehicle, the motor vehicle including a rear cargo compartment with a cargo bed adjoined by a cargo sidewall, the cargo sidewall including a rail cap projecting from an upper portion of a rear quarter panel, the method comprising:
passing an air inlet port through the rear quarter panel of the cargo sidewall, the air inlet port being configured to intake fore-aft airflow;
passing an air outlet port through the rail cap of the cargo sidewall, the air outlet port being configured to eject the airflow intake from the cargo sidewall; and
attaching an air duct to an inboard surface of the rear quarter panel, the air duct fluidly connecting the air inlet and air outlet ports, the air duct including transverse and vertical channels configured to redirect the airflow intake in an inboard and upward direction.

15. The method of claim 14, wherein the air inlet port includes an air scoop with a scoop body having a forward-facing intake opening, the method further comprising mounting the scoop body to protrude from an outboard surface of the rear quarter panel.

16. The method of claim 14, wherein the air outlet port includes an air knife nozzle configured to inject the airflow intake upward at a right angle or inboard at an oblique angle relative to an upper surface of the rail cap.

17. The method of claim 14, wherein the air duct further includes a first constricted section configured to constrict and thereby accelerate the airflow intake.

18. The method of claim 17, wherein the first constricted section of the air duct is fluidly upstream from the transverse and vertical channels.

19. The method of claim 18, wherein the air duct further includes a second constricted section configured to constrict and thereby accelerate the airflow intake.

20. The method of claim 19, wherein the second constricted section is fluidly downstream from the transverse and vertical channels.

* * * * *